Jan. 1, 1963  R. G. SCHMIDT ET AL  3,071,681

PHOTOFLASH APPARATUS

Filed Jan. 13, 1961

INVENTORS
RONALD G. SCHMIDT
JOHN G. TOMKINSON
BY
ATTORNEY

United States Patent Office 3,071,681
Patented Jan. 1, 1963

3,071,681
PHOTOFLASH APPARATUS
Ronald G. Schmidt and John G. Tomkinson, Denver, Colo., assignors to Minneapolis-Honeywell Regulator Company, Minneapolis, Minn., a corporation of Delaware
Filed Jan. 13, 1961, Ser. No. 82,562
3 Claims. (Cl. 240—1.3)

The present invention relates to improvements in that portion of the photographic art utilizing electronic photoflash apparatus.

A broad object of the invention is to provide a simple means of mechanically and electrically placing a gas-filled, electronically fired flashtube within a reflecting enclosure. Present practice in the art usually provides for positioning and affixing the flash tube by methods wherein several manufacturing and assembly steps or procedures are required.

The present invention provides a means whereby the bracket or clip used for mechanically affixing the photoflash tube may also be utilized as a triggering electrode. Present practice quite generally involves "painting" a metallic or conductive strip on the tube itself. To this painted strip is applied a voltage for the purpose of initially ionizing the gas contained within the tube with or for a resultant purpose of "triggering" or starting the ionization process that results in a brilliant flash. The apparatus, the details of which are divulged in this application, eliminates the manufacturing steps necessitated by painting the conductive strip. The mounting means serves in the capacity of a triggering electrode.

The invention protects the photoflash reflector surface from the heat generated by the photoflash tube. Many, or most reflecting surfaces in the photo art are disposed by a vacuum metalizing process. This vacuum metalizing process places a very thin reflecting surface on the reflector shell which is susceptible to heat damage. It is contemplated that the bracket frame member, as incorporated in the present invention, may serve as a buffer between the flash tube and the reflecting surface. The heat protection afforded by this invention will allow an even thinner coating of reflecting surface or a more heat sensitive coating material for the general reflector construction than has been used in the past. By being positioned between the flash tube and the reflecting surface, the bracket frame member will prevent the reflecting surface from being confronted with the heat generated.

The subject invention will provide a positive method for exact positioning of the photoflash tube. Study and past experience have shown that in order to get maximum advantage from a given concave reflecting surface, exact positioning of the flash tube with respect to the concave surface is very important. The present invention, by the simple procedure of inserting the bracket, will perform the operation of the desired exacting positioning.

Servicing in the field is also made easier in view of the simplified method of tube placement. Much concern has been expressed over the servicing problem represented by the necessity of positioning a replacement tube in the proper position.

The present invention also provides a firm and stable, yet resilient photoflash tube mounting means. It is desirable wherein a glass object such as a photoflash tube is utilized, to provide a cushion against shock resulting from accidental dropping or striking of the flash unit. The combination of resilient grasping fingers and spring bias mounting provides an area of "give" which will create the desired cushioning effect. Also, it might be added, that the resilient fingers provide a holding means for the phototube which will allow a wide degree of tolerance for manufacturing variations within a given tube type and also allow for expansion or contraction due to variations in temperature or other affecting factors while still providing a firm, positive grip on the tube.

Figure 1:
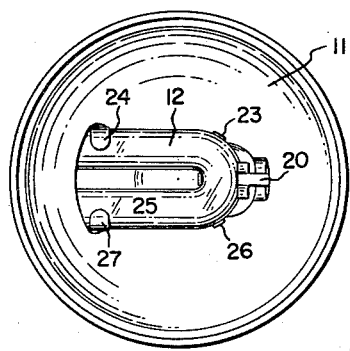
FIGURE 1 is a front or full face view of a photoflash reflector, showing a U-shaped flash tube mounted within it by means of the bracket which is shown in detail at FIGURE 3.
Figure 3:
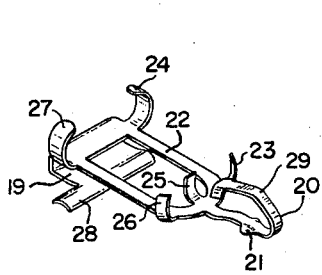
FIGURE 3 is a detailed view of the mounting bracket.

In FIGURE 1 of the drawing, the reference numeral 11 refers to the photoflash reflector which is of the usual forwardly directed concave design. Numeral 12 refers to an electronic discharge device or gas-filled photoflash tube which is of the standard U-shaped construction. The photoflash tube is held in place within the reflector by a mounting clip or bracket (such as the brackets shown at FIGURE 3 or at FIGURE 4).

Figure 2:
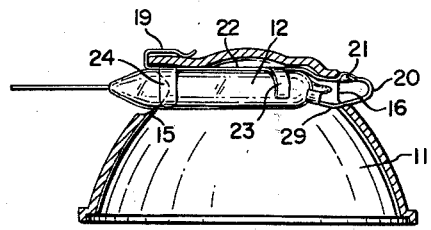
FIGURE 2 shows the reflector in cross section to provide a detailed picture of the manner in which the bracket and flash tube are mounted within the reflector.

FIGURE 2 shows the U-shaped photoflash tube 12 mounted in position. Reflector 11 is provided with two diametrically opposed openings 15 and 16, which serve the purpose of allowing the mounting clip or bracket to be inserted in position within the reflector. The bracket is fitted with an extension 19 formed in a manner to create a U-shaped clamp means which "fits" over a protruding portion of the reflector body in a manner that provides pressure coupling thereto. (Reference is made to FIGURE 3 for detailed numbering of the bracket.) Reference numeral 20 identifies an extension of the bracket frame member which is constructed in a manner to form a spring biasing adapted to be passed through opening 16 and spring bias the clip or holder against the reflector body. The bracket extension 20 which is also constructed of a material having a sufficient resilience to give it a spring-like characteristic, is adapted to pass through an opening or hole in the reflector. It is formed in such a manner as to provide a spring biasing against the sides of the opening through which it is passed. Bracket extension 20 is provided with protrusions 21 for the purpose of "locking" the clip into place after it has been inserted to the desired position within the reflector. When bracket extension 20 has been passed through to the desired position, its spring-like characteristic forces its opposing portions apart, which in turn forces the protrusions 21 to lock against the reflector body, thus preventing the bracket from being displaced from its desired position until such time as the extension 20 is compressed to a point whereby protrusions 21 may be released and passed through the reflector opening 16.

The bracket frame member (the main portion or flat surface designated as 22 in FIGURE 3) is presented between the reflector shell and the photoflash tube, and has the effect of protecting the surface of the reflector from the heat given off by the flash tube. Resilient grasping fingers 23 and 24 are shown in FIGURE 2, acting in their capacity of holding the photoflash tube in a captive position. As may be seen from FIGURE 2, the bracket (which is shown in detail at FIGURE 3) is constructed and positioned in such a manner as to "hold" the flash tube in a captive position but in effect, "floating" on the end which is held in position by the spring bias means. The resilient fingers which hold the photoflash tube are constructed in a manner which will allow expansion or contraction of the flash tube while they maintain their firm grip thereon. The bracket is shown in detail at FIGURE 3. Numerals 23, 24, 25, 26, and 27 refer to the grasping fingers which form a part of the bracket. These fingers, as stated previously are constructed of a material and in a manner that makes them resilient or springlike. The broad U-shaped frame extension 19 forms a channel which is adapted to fit over a portion of the reflector body in a manner that creates a "pressure holding." The U-shaped member 19 is fitted with an extension 28 for the purpose of allowing an electrical connection thereto. The main frame 22 is formed in a manner that allows it to follow the contour of, and to be placed in immediate proximity with the photoflash tube. Thus the frame member, which is made of an electrically conductive material, forms a path of current for "triggering" or "firing" voltage which is applied at the clip extension 28.

Figure 4:
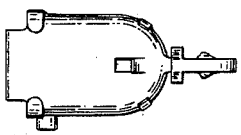
FIGURE 4 shows a modified form of the mounting bracket wherein the frame member is of a "solid" construction which provides a greater amount of heat protection for the reflector surface.

A modified clip frame member, as shown in FIGURE 4, is of a solid construction. By this "solid" construction, a greater amount of shielding against heat damage is provided. The clip as represented in FIGURE 4 is also utilized for all other purposes including that of a triggering electrode, as is the construction represented at FIGURE 3.

From the above description, it is evident that we have invented an apparatus which provides an accurate, simplified and less expensive means of phototube mounting.

We claim as our invention:

1. In combination; a photoflash reflector having a pair of diametrically spaced openings, a curved photoflash tube, a one piece bracket having resilience and electrical conductive properties, said bracket having a curved frame member formed to follow the contour of said curved photoflash tube and having resilient fingers extending therefrom, means including said fingers for holding said photoflash tube in a captive position, U-shaped clamp means formed by a first extension on one end of said frame member, a second extension on said frame member including a resilient spring clip, said first and second extensions forming means removably mounting said photoflash tube and said bracket within said reflector such that said second extension enters one of said spaced openings in said reflector and expands to engage said reflector with said first extension then in position at the other of said openings to clamp a portion of said reflector within said U-shaped clamp means, said photoflash tube and bracket being removable from said reflector by virtue of compression of said second extension to disengage said reflector, and a tab formed on said bracket adapted to receive electrical wiring means.

2. In combination; a photoflash reflector having a pair of spaced openings, a curved photoflash tube, a one piece bracket having resilience and electrical conductive properties, said bracket having a curved frame member formed to follow the contour of said curved photoflash tube and having resilient fingers extending therefrom, means including said fingers for holding said photoflash tube in a captive position, a first extension on said frame member, a second extension on said frame member, said first and second extensions having means removably mounting said photoflash tube and said bracket within said reflector such that said second extension enters one of said openings in said reflector with said first extension then in position at the other of said openings, and a tab formed on said bracket adapted to receive electrical wiring means.

3. The combination as claimed in claim 2 wherein said bracket is positioned between said photoflash tube and said reflector to protect said reflector from the heat generated by said photoflash tube.

References Cited in the file of this patent

UNITED STATES PATENTS

| | | |
|---|---|---|
| 1,975,820 | Wright | Oct. 9, 1934 |
| 2,392,828 | Noel | Jan. 15, 1946 |
| 2,766,020 | Woods | Oct. 9, 1956 |
| 2,906,862 | McCammon | Sept. 29, 1959 |
| 2,948,938 | Holton | Aug. 16, 1960 |